Patented June 24, 1930

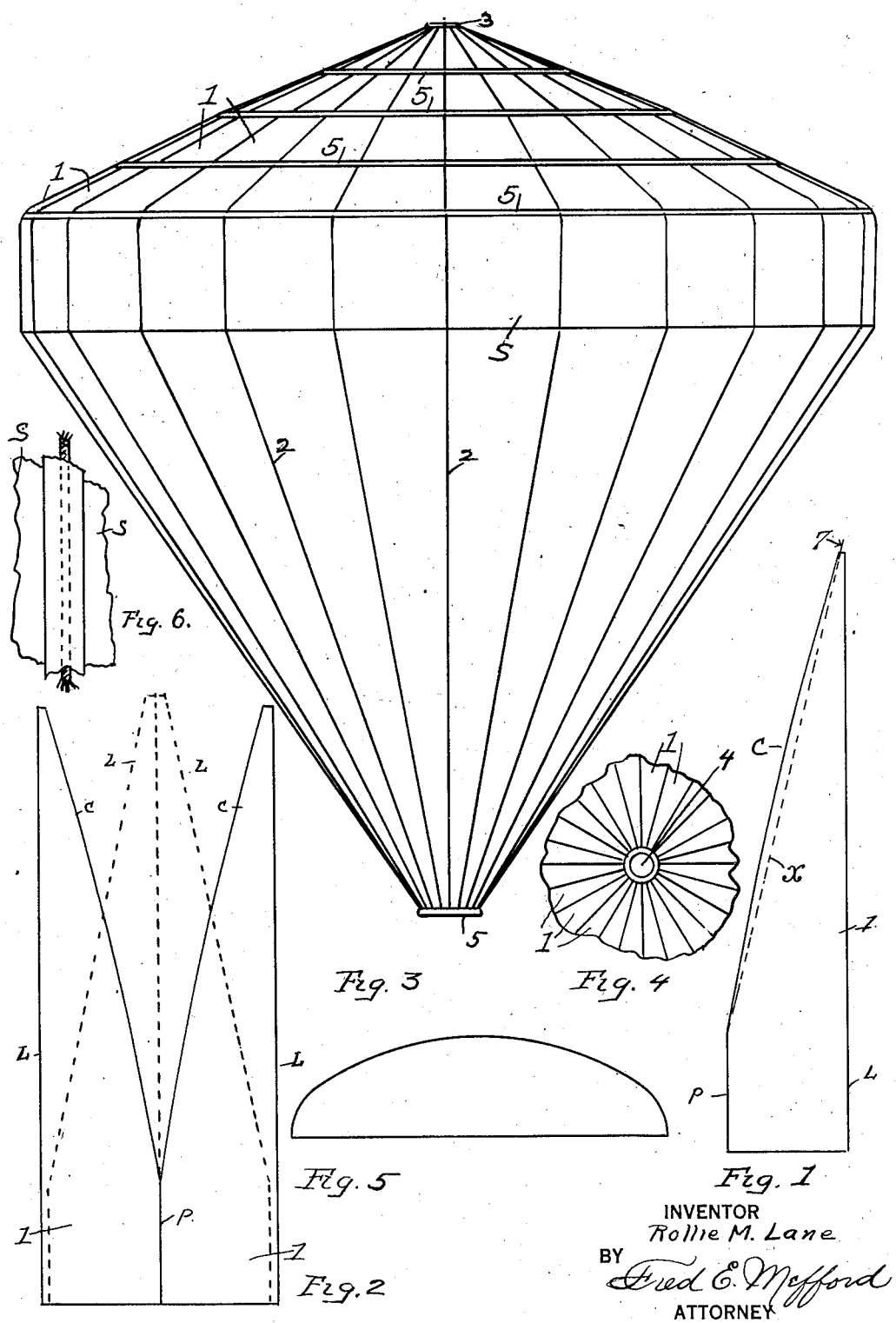

1,767,534

UNITED STATES PATENT OFFICE

ROLLIE M. LANE, OF COLORADO SPRINGS, COLORADO

PARACHUTE

Application filed September 26, 1929. Serial No. 395,344.

My invention relates to parachutes and my object is to provide a parachute which will enable the user to make a slower descent than is possible with the ordinary parachutes now in use. Other objects will appear as the description progresses.

Figure 1 represents a plan view of one of the sections of which the parachute is fabricated; Fig. 2, a view of a pair of sections partially joined showing the relationship of the edges of the sections forming the pair; Fig. 3, an elevation of the parachute at rest showing the shape when not distorted by air pressure; Fig. 4, a fragmentary plan view showing the vent; Fig. 5, a reduced view showing the contour of the parachute when in action; and Fig. 6, an enlarged fragmentary view showing the manner of joining the sections and attaching to the ropes.

Although I show the preferred embodiment of my invention, I do not thereby limit myself to the precise form shown but wish it understood that within the scope of what hereinafter is claimed, various changes in the precise details of construction may be made without departing from the spirit of the invention.

Each section 1 is cut from a strip of fabric so as to provide a longitudinal straight edge L extending the full length of the section, a longitudinal edge P extending substantially one fifth the length, and a curved edge C, the remainder of the length.

The sections are arranged in pairs as shown in Fig. 2 and the edges P and C of one section joined to the corresponding edges of the other section in the pair. The pairs of sections thus joined are disposed adjacent one to the other and their longitudinal edges joined, resulting in the formation of the canopy portion and a skirt S. The seams are reenforced with ropes 2 extending from a ring 3, forming the vent 4, to a ring 5. Tape 5 is double sewed in concentric circles to reenforce the fabric and to prevent tearing for any considerable distance.

The cutting of the sections and the joining as above described provide a skirt S which enables the parachute to hold substantially twice as much air as an ordinary parachute of the same diameter. With this skirt the air is less liable to escape at the side of the parachute and is therefore made to escape through the vent, thereby insuring a slower and smoother descent than is possible without the skirt. The particular cutting and joining of the sections permits the parachute to assume substantially a smooth spherical surface in descent.

For a 24 foot parachute I recommend using fabric strips 15 feet long, cutting each strip 3 feet wide at the bottom. This will give a section having a longitudinal straight edge 15 feet long, a parallel straight edge 3 feet long and the curved portion extending obliquely so as to provide for a 7 inch vent. When these strips are sewed together as indicated, they form a parachute 24 feet in diameter. 24 sections will result in a 24 foot parachute, therefore for each section added, one foot will be added to the diameter, it being understood that the length of the sections should be correspondingly increased to secure the smooth surface when in action.

A two and one half inch upper edge should be provided on each section to be attached to ring 3. If a line $x$ be drawn from 6 to 7 (Fig. 1) it will form the chord of the arc forming the convex portion C. This chord intersects the radius normal to it at a point two and one half inches distant from the arc.

Having thus described my invention, what I claim as new and desire to secure by Letters Patent is:

1. A section for a parachute, comprising a strip of fabric cut so as to provide a longitudinal straight edge extending the full length of said strip, and a longitudinal edge having a straight portion extending parallel wih said first named edge for substantially one fifth, and a convex curved portion extending obliquely towards said first named edge the remainder of the length of said strip.

2. A pair of sections for a parachute, each section comprising a strip of fabric cut so as to provide a longitudinal straight edge extending the full length of said strip and a longitudinal edge having a straight portion extending for a distance parallel with said first named edge and a convex curved portion extending obliquely towards said first named edge for the remainder of the length of said strip, the curved portion and the contiguous curved portion of one section being joined to the corresponding portions of the other section in said pair.

3. In a parachute, the combination of a plurality of pairs of sections joined together at their respective straight edges to form a canopy portion provided with a skirt, each pair of sections comprising two strips of fabric cut so as to provide a longitudinal straight edge extending the full length of said strip, and a longitudinal edge having a straight portion extending for a distance parallel with said first named edge and a convex curved portion extending obliquely towards said first named edge for the remainder of the length of said strip, the curved and contiguous straight portions of one section being joined to the corresponding curved and straight portions of the other section in said pair of sections.

4. In a parachute, the combination of a plurality of pairs of sections joined together at their longitudinal straight edges to form a canopy portion provided with a skirt, each pair of sections comprising two strips of fabric cut so as to provide a longitudinal straight edge extending the full length of said strip, and a longitudinal edge having a straight portion extending for a distance parallel with said first named edge and a convex curved portion extending obliquely towards said first named edge the remaining length of said strip, the curved and contiguous straight portions of one section being joined to the corresponding curved and contiguous portions of the other section in the pair of sections; a ring in the top of said canopy portion to provide a vent; ropes connected to said ring and disposed along the seams formed by joining said edges of said sections; and a ring connected to the lower ends of said ropes.

5. In a parachute, the combination of a plurality of pairs of sections joined together to form a canopy portion and a skirt, each pair of sections comprsing two strips of fabric each cut so as to provide a longitudinal straight edge running the full length of said strip, and a longitudinal edge having a straight portion extending substantially one fifth the length of said strip parallel with said first named edge and a convex curved portion extending obliquely towards said first named edge the remaining four fifths the length of said strip, the curved and contiguous portions of one section being joined to the corresponding portions of the other section in the pair; a tape sewed over each seam to form a tube; a ring in the top of said canopy portion to form a vent; a rope run through each tube, formed by said tape, and attached to said ring; a ring connected to the lower ends of said ropes; and a series of tapes sewed in concentric circles on said canopy and skirt portions to reenforce the fabric.

ROLLIE M. LANE.